US007561690B2

United States Patent
Maurin et al.

(10) Patent No.: US 7,561,690 B2
(45) Date of Patent: Jul. 14, 2009

(54) METHOD AND SYSTEM FOR COMMUNICATING A CERTIFICATE BETWEEN A SECURITY MODULE AND A SERVER

(75) Inventors: Joël Maurin, Verrières le Buisson (FR); René Martin, Bures sur Yvette (FR); Jean-Yves Dujonc, Maule (FR)

(73) Assignee: Bull SA, Louveciennes (FR)

( * ) Notice: Subject to any disclaimer, the term of this patent is extended or adjusted under 35 U.S.C. 154(b) by 898 days.

(21) Appl. No.: 10/053,703

(22) Filed: Jan. 24, 2002

(65) Prior Publication Data

US 2002/0133700 A1 Sep. 19, 2002

(30) Foreign Application Priority Data

Jan. 24, 2001 (FR) .................................. 01 00946

(51) Int. Cl.
*G06F 7/04* (2006.01)
*G06K 9/00* (2006.01)
*G06F 11/30* (2006.01)
*G06F 12/14* (2006.01)

(52) U.S. Cl. .................... 380/202; 726/26; 713/193
(58) Field of Classification Search .............. 713/150, 713/182

See application file for complete search history.

(56) References Cited

U.S. PATENT DOCUMENTS

| 6,510,464 | B1 * | 1/2003 | Grantges et al. | 709/225 |
| 6,598,167 | B2 * | 7/2003 | Devine et al. | 726/8 |
| 2005/0210296 | A1 * | 9/2005 | Devine et al. | 713/201 |

FOREIGN PATENT DOCUMENTS

| WO | WO 00 00879 A | 1/2000 |
| WO | WO 01 03398 A | 1/2001 |

* cited by examiner

*Primary Examiner*—Nasser G Moazzami
*Assistant Examiner*—Chinwendu C Okoronkwo
(74) *Attorney, Agent, or Firm*—Miles & Stockbridge P.C.; Eric G. King

(57) ABSTRACT

A network communications method communicates a certificate from a client machine to a server machine through a security module. The protocol used between the client and server machines is HTTP or an equivalent protocol, and a security protocol such as SSL or an equivalent is implemented between the client machine and the security module. The steps of the method include inserting the certificate into a cookie header of a request in HTTP or an equivalent protocol, and then transmitting the request from the security module to the server machine.

16 Claims, 1 Drawing Sheet

METHOD AND SYSTEM FOR COMMUNICATING A CERTIFICATE BETWEEN A SECURITY MODULE AND A SERVER

BACKGROUND OF THE INVENTION

1. Field of the Invention

The present invention concerns the field of secure client-server communications in a computer system, and more specifically a method and a device for communicating to a server machine a certificate sent by a client machine, via a security module.

2. Description of the Related Art

HTTP (HyperText Transfer Protocol) is an application level communication protocol. The HTTP protocol is used between a client and a server to transmit and receive data in requests without state management; each request is executed independently of the others, without knowledge of the previous requests. The HTTP protocol does not provide for any encryption. Moreover, the mutual authentication methods offered by the HTTP protocol do not provide any guarantees. Authentication is a procedure that makes it possible to obtain and verify the identity of a party sending HTTP requests.

In order to solve the problem of the lack of encryption and authentication in the HTTP protocol, the current systems use security protocols such as the SSL (Secure Sockets Layer) protocol. The SSL protocol makes it possible to transmit documents securely via the network of the Web. There are other security protocols such the TLS (Transport Layer Security) protocol, which is an extension of the SSL protocol. Security protocols like SSL or TLS make it possible to encrypt the exchanges and authenticate the parties, in this case the client and the server; they offer services for authentication, integrity and confidentiality.

Security protocols like SSL and TLS use strong authentication methods based on public key cryptography methods. Each party owns a pair of asymmetric keys, called public/private keys; the key used to encrypt the information is different from the one used to decrypt it.

Public key cryptography methods use a certificate that makes it possible to verify that a given public key is actually associated with the legitimate owner and that it is in fact the owner who is using it. A certificate is a digital document that attests to the ownership of a public key by a person. Such a certificate must be issued by a recognized institution outside the secure system, called a certification authority (CA). The certificate makes it possible to prove the authenticity of a user's public key and hence to authenticate the user without ambiguity. When a person signs and sends a document, the recipient obtains the sending person's certificate. The recipient can verify the veracity of the certificate with the certificate of the certification authority; he can then verify the sender's signature.

The management module of the SSL protocol at the server level is integrated into the server or into an intermediate machine called a security box or front-end box. The security box is a splitting machine upstream from the server. The security box handles the SSL protocol. The SSL protocol is not implemented between the security box and the server. The encryption and the authentication are performed between the client and the security box. Optionally, the security box authenticates the client, particularly by means of a certificate.

The problem posed by the present invention is the lack of means in the HTTP protocol for returning said certificate from the security box to the server.

The certificate contains information that can be very useful for the server, such as for example the real identity of the client.

One object of the present invention consists of solving the problem of the lack of means for communicating a certificate between the security box and the server.

SUMMARY OF THE INVENTION

In this context, the subject of the present invention is a method for communicating to a server machine a user certificate sent by a client machine via a security module of a computer system, the protocol used between the client machine and the server machine being HTTP or an equivalent protocol, a security protocol like SSL or an equivalent protocol being implemented between the client machine and the security module, characterized in that it consists of inserting said certificate into a cookie header of a request in HTTP or an equivalent protocol in order to transmit them from the security module to the server machine.

The present invention also concerns the system for implementing said method, the program for implementing said method and the security box.

BRIEF DESCRIPTION OF THE DRAWINGS

Other characteristics and advantages of the invention will emerge in light of the following description, given as an illustrative and non-limiting example of the present invention, in reference to the attached drawing, in which.

DESCRIPTION OF THE PREFERRED EMBODIMENTS

Figure 1:
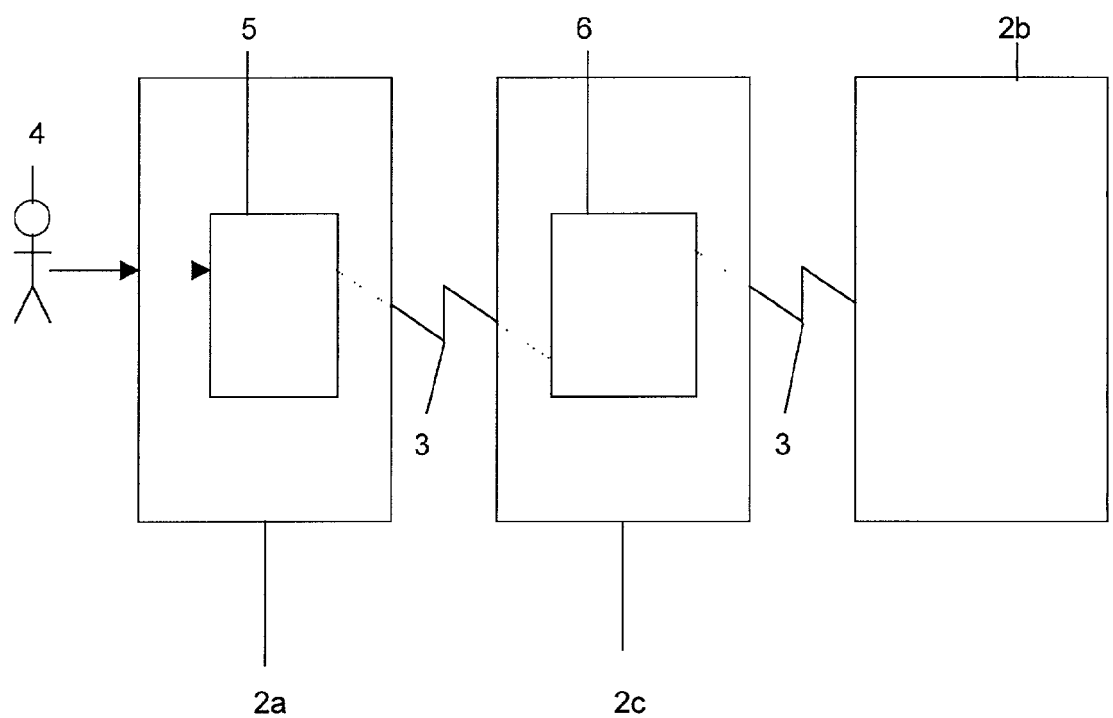
FIG. 1 is a schematic view of an embodiment of the system according to the invention.

As shown in FIG. 1, the system 1 is distributed and composed of machines 2a, 2b, 2c organized into one or more networks 3. A machine 2 is very large conceptual unit that includes both hardware and software. The machines can be very diverse, such as for example workstations, servers, routers, specialized machines, telephones or gateways between machines. Only the components of the machines 2 of the system 1 that are characteristic of the present invention will be described, the other components being known to one skilled in the art. The network 3 is to be understood in the broad sense, i.e. any means of communication between machines.

As shown in FIG. 1, in the present invention, the system is a computer system 1 comprising a machine 2a called a client machine associated with a calling entity 4, in the present example a user 4, and a machine 2b called a server machine capable of responding to requests from said user 4. The user 4 can be a physical person, a machine, a software module or another entity. The user is contained in the client machine 2a or is outside it (as in FIG. 1).

In the embodiment illustrated, the client machine 2a includes a browser 5 and the server machine 2b is in the form of a server.

The system 1 includes a security module 2c, which will be described below.

The communication protocol between the client machine 2a and the server machine 2b is the HTTP protocol or any equivalent protocol. A protocol equivalent to the HTTP protocol is a protocol that implements the transport of cookies (as they are called in current computer language, as seen below).

The HTTP protocol defines a structure for the messages transmitted in the client→server direction and a structure for the messages in the server→client direction. Each of the messages includes a start line, followed by any number of headers, a blank line and the body of the message. The headers allow the client machine 2a to transmit to the server machine 2b information related to an HTTP message or to the user 4, or conversely, allow the server machine 2b to transmit to the client machine 2a information related to an HTTP message or to the server machine 2b. There are defined headers in the HTTP protocol, but it is possible to create temporary or experimental headers.

A header is composed of a unique name followed by ":" and by the value of the field. The various headers are separated from one another by a carriage return "CRLF" (Carriage Return Line Feed).

The following HTTP message will be used as an example:

```
"GET /bar2    HTTP/1.0 CRLF
Connection : Keep-Alive    CRLF
User-Agent : Mozilla/4.02 [in] (WinNT;    I)    CRLF
Host : bijou.mcom.com: 1999    CRLF
Accept : image/gif, image/x-xbitmap, image/jpeg, image/pjpeg,
*/*    CRLF
Accept-Language : en-US, en-GB, en    CRLF
Accept-Charset : iso-8859-1, *, ntf-8    CRLF
Cookies : cookie1=value1; cookie2=value2:
%CERT=value of the certificate    CRLF
Data >>
```

The expression "GET/bar 2 HTTP/1.0 CRLF" corresponds to the start line. The expressions "Connection, User-Agent, Host, Accept, Accept-Language, Accept-Charset, Cookies" correspond to the headers of the HTTP message. The headers are composed of a unique name "Cookies" followed by ":" and by the value of the field "cookie1=value1; cookie2=value2; % CERT=value of the certificate". The expression "Data" corresponds to the body of the message.

In communications between client and server, a mechanism called a cookie in current computer language is more and more frequently used.

The cookie is a piece of information sent by a server machine 2b, stored on the client machine 2a end in a client/server communication and retrieved by said server machine 2b during a subsequent utilization.

When a calling entity, and more precisely a user 4, connects to a site on the network of the Web, information on the user 4 is collected in a cookie by the server machine 2b and sent to the browser of the client machine 2a, which stores it for a subsequent utilization. The cookies are conveyed in the headers of HTTP messages.

In the example of the HTTP message illustrated, the cookies are conveyed in the header entitled "Cookies." The message includes three cookies, "Cookie1", "Cookie 2", and "% CERT", whose respective values "value1", "value2", "value of the certificate" are given after the "=" signs.

When the user reconnects to the site in question, the browser 5 sends the corresponding cookie to the server machine 2b in an HTTP request header. The server machine 2b uses the information in the cookie to configure itself based on the user 4 that is calling it. The information in question is for example a piece of personal information related to said user 4 such as a unique identifier, a response to a questionnaire that the user 4 has filled out on the site visited, or a date and time at which certain pages have been read. Generally, a cookie stores the preferences of the user 4 when he uses a given site in order to prepare personalized pages when he connects to said site again. The cookie mechanism also makes it possible to change the advertising impressions, particularly during a series of requested pages, or to adapt them to the user 4 in question or even to create statistics.

The SSL protocol is implemented between the client machine 2a and the security module 2c in order to secure the communications between client and server.

In an SSL connection between a client and a server, the client may have a certificate so that it can be authenticated. The certificate, delivered by a certification authority, is a recognized means for presenting its identity as well as other information linked to the owner of the certificate (his identity, his unique name, his public key and the associated encryption algorithm, etc.), and to the certification authority that delivered it (its identity, its unique name, its signature and the algorithm used for signing, etc.). The signature of a certificate is a digest of the unique name of the owner of said certificate and of the said owner's public key, encrypted with the private key of the certification authority. Each certificate therefore has its own signature, which makes it possible to guarantee the authentication. A user authenticates another user's public key simply by decrypting the signature of the certificate with the public key of the certification authority.

In the system 1, the security module 2c handles a security protocol. The security module 2c is in the form of a machine 2 (embodiment illustrated) or a software module integrated into a machine 2 such as the server machine 2b.

In the embodiment of the invention illustrated in FIG. 1, the security module 2c is an intermediate machine 2. The security module 2c, called a security or front-end box, is split off upstream from the server machine 2b.

The security module 2c makes it possible to handle a security protocol such as SSL or TLS or an equivalent protocol. A protocol equivalent to the SSL or TLS protocol is a protocol that makes it possible to authenticate the user 4 by means of a certificate. The security module 2c makes it possible to transmit a certificate from the client machine 2a to the server machine 2b.

The security module 2c includes analyzing means 6 that make it possible to request a certificate of the user 4 from the client machine 2a, retrieve the certificate of the user 4 requested from the client machine 2a and send it to the server machine 2b. In the embodiment illustrated, the analyzing means are in the form of a software module integrated into the security module 2c.

The certificate from the client machine 2a requested by the server machine 2b during the mutual authentication of the SSL protocol is transmitted from the client machine 2a to the security module 2c. Since the SSL protocol is not implemented between the security module 2c and the server machine 2b, and since the HTTP protocol does not make it possible to transmit certificates, the certificate containing precious information is blocked at the level of the security module. The present invention consists of transmitting the certificate from the security module 2c to the server machine 2b in a cookie header of HTTP requests.

The information constituted by the certificate is not information that is designed to constitute a cookie. The certificate is not sent by the server machine 2b and is not stored by the client machine 2a. However, one of the initial purposes of the cookie is to be able to convey information concerning the sender of an HTTP request.

Thus, the server machine 2b benefits from the information contained in the certificate, such as:
  the public key;
  the name of the owner;
  the expiration date of the certificate;
  the name of the certification authority;
  the serial number of the certificate;

the signature of the certification authority.

The transport of the certificate by means of an HTTP request cookie header does not involve any modification of the server machine 2b. In fact, the server machine 2b does not analyze the cookie headers; it transmits them directly to the application in question.

The method according to the present invention works in the following way.

The user 4 requests access to a page of a given site via the browser 5. The browser 5 sends an HTTP/SSL request through the network 3 to the server machine 2b. The browser 5 requests the universal address (URL—Uniform Resource Locator) of the secure page of the site in question with the prefix "https://". The request, called an access request, is intercepted by the security module 2c, which handles the security services offered by the security protocol used, i.e., in the present example, the SSL protocol. A TCP connection is initialized. The dialog begins with the protocol known as the "handshake," during which a mutual recognition between the user 4 and the security module 2c and an exchange of keys take place.

In the specifications of the SSL protocol, the authentication of the user 4 is optional. In the present invention, the authentication of the user 4 remains optional. If it is required, the analyzing means 6 of the security module 2c request the sending in the "handshake" procedure of a certificate by the client machine 2a. The means 6 transmit the SSL message "CertificateRequest" to the client machine 2a through the network 3.

The client machine 2a responds by transmitting the certificate of the user 4 through the network 3 to the security module 2c. The certificate is sent by the machine 2a by means of the SSL "Certificate" message.

The module 2c decodes the HTTP message and retrieves the certificate of the user 4 if it has been requested by the module 2c.

Once the handshake protocol of the SSL protocol is finished, and if a certificate has been requested and retrieved by the module 2c during the handshake protocol, the analyzing means 6 search the HTTP request for access to the secure page of the site in question sent by the client machine 2a to see if a cookie header exists, i.e., if there is a header entitled "Cookies." In the example illustrated, the header "Cookies" is detected. If no cookie header is present, the analyzing means create a cookie header.

In the existing or created cookie header, the analyzing modules add a specific cookie to which they assign for example a default name; in the example illustrated, the cookie CERT is added to the header Cookies. The default name, in the present example the name CERT, is a configurable name that enables the server machine 2b to distinguish said certificate from the various cookies. The specific cookie added has as its value the certificate retrieved from the user 4, i.e. in the example illustrated "value of the certificate."

In the example illustrated, the analyzing means 6 search for the expression "CRLF Cookies:". Once the cookie header is found, the analyzing means 6 search for the sign "CRLF" in order to find the end of the cookie header. The means 6 insert at the end of the cookie header the expression "%CERT=value of the certificate CRLF".

The analyzing means 6 delete from the certificate, in the "value of the certificate" example inserted into the specific cookie, all of the separators used in the headers such as CRLF, ";" and "," and replace them for example with a space. The separators are deleted from the certificate in order to prevent them from being interpreted as constituting several cookies or headers.

The analyzing means 6 transmit the HTTP access request containing the certificate to the server machine 2b. The server machine 2b transmits the cookies received, and in particular the certificate, directly to the application in question.

The method according to the invention thus consists of retrieving the certificate of the user transmitted from the client machine 2a to the server machine 2b, of inserting said certificate into a cookie header of an HTTP access request and of sending the HTTP access request containing said certificate to the server machine 2b.

Hence, the present invention concerns a method for communicating to the server machine 2b a certificate of the user 4 sent by the client machine 2a via the security module 2c, characterized in that it consists of inserting said certificate into a cookie header of a request in HTTP or an equivalent protocol sent by the client machine 2a in order to transmit them from the security module 2c to the server machine 2b.

The method according to the invention consists of removing from said certificate all of the separators used in the headers of the HTTP messages prior to its insertion into a cookie header.

The method consists of searching, prior to the insertion of said certificate into a header, to see if a cookie header is present in the HTTP request sent by the client machine 2a and if not, of creating one.

The method according to the invention consists of adding a specific cookie into the existing or created cookie header, a configurable default name being assigned to said specific cookie, enabling the server machine 2b to distinguish the certificate from the cookies of the HTTP or equivalent request.

The method consists of transmitting to the server machine 2b the HTTP or equivalent request sent by the client machine 2a into which the certificate has been inserted.

The present invention also concerns the security machine 2c that makes it possible to secure the exchanges between the client machine 2a and the server machine 2b, characterized in that it includes the analyzing means 6 that make it possible to transmit the certificate into a cookie header of an HTTP or equivalent request.

The present invention also relates to the system comprising the client machine 2a, the server machine 2b, and the security module 2c, characterized in that the security module 2c includes the analyzing means 6 that make it possible to transmit a certificate sent by the client machine 2b into a cookie header of an HTTP or equivalent request sent by the client machine 2a.

The present invention also relates to the program integrated into the security module 2c that allows the method described above to be executed when the program is run in a machine.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

We claim:

1. A method of communicating to a server machine a certificate of a user which is sent by a client machine via a security module of a computer system, wherein a first protocol used between the client machine and the server machine is a non-secure stateless protocol, and a second protocol used between the client machine and the security module is a secure stateless protocol, said method comprising:

transmitting said certificate from the client machine to said security module using said second secure stateless protocol;
inserting, said certificate unmodified into a cookie header of a request in the first non-secure stateless protocol, the inserting being done by the security module; and
transmitting the request, including said cookie header containing said certificate, from the security module to the server machine using said first non-secure protocol;
wherein said certificate has a plurality of separators; and
wherein said cookie header of said request includes a plurality of cookies.

2. A method according to claim 1, further comprising:
removing from said certificate all separators used in headers of the request prior to insertion of said certificate into said cookie header of said request.

3. A method according to claim 1, wherein said inserting step further comprises:
determining, prior to the inserting step, whether an existing cookie header is present in the request sent by the client machine; and
creating a new cookie header if said existing cookie header is not present in the request sent by the client machine.

4. A method according to claim 3, further comprising:
adding a specific cookie into the existing or new cookie header; and
assigning a configurable default name to said specific cookie to enable the server machine to distinguish the certificate from cookies of the request.

5. An apparatus comprising:
a hardware security machine configured to secure exchanges between a client machine and a server machine of a computer system, wherein a first protocol used between the client machine and server machine is a non-secure stateless protocol, and a second protocol implemented between the client machine and said security machine is a secure stateless protocol, wherein said security machine further comprises an analyzer configured to insert an unmodified certificate received from the client machine using said second secure stateless protocol into a cookie header of an HTTP or equivalent request, and further configured to transmit to a server said unmodified certificate contained in said cookie header using said first non-secure stateless protocol; and
wherein said cookie header of said request includes a plurality of cookies;
transmitting said unmodified certificate from the client machine to said security machine using said second secure stateless protocol;
inserting, said certificate unmodified into a cookie header of a request in the first non-secure stateless protocol, the inserting being done by the analyzer.

6. A system comprising:
a client machine;
a server machine; and
a hardware security module interposed between the client machine and the server machine and provided in communication therewith;
wherein the client machine and the server machine are configured to communicate using a first protocol, said first protocol comprising a non-secure stateless protocol;
wherein the client machine and the security module are configured to communicate using a second protocol, said second protocol comprising a secure stateless protocol; and wherein the security module comprises an analyzer configured to insert an unmodified certificate sent by the client machine into a cookie header of a request in conformance with said non-secure stateless protocol, and wherein the analyzer is further configured to transmit to a server said unmodified certificate contained in said cookie header using said non-secure stateless protocol, said cookie header of said request including a plurality of cookies;
transmitting said unmodified certificate from the client machine to said security machine using said second secure stateless protocol;
inserting, said certificate unmodified into a cookie header of a request in the first non-secure stateless protocol, the inserting being done by the analyzer.

7. One or more computer readable storage media upon which is encoded and stored a sequence of programmable instructions which, when executed by one or more processors, cause the processors to:
transmit a certificate of a user from a client machine to a security module using a secure stateless protocol;
insert at the security module said certificate unmodified into a cookie header of a request conforming to a non-secure stateless protocol; and
transmit the request, including said cookie header containing said unmodified certificate, from the security module to the server machine using the non-secure stateless protocol;
wherein said certificate has a plurality of separators; and
wherein said cookie header of said request includes a plurality of cookies.

8. The computer-readable storage media of claim 7, further comprising instructions to:
remove from said certificate all separators used in headers of the request prior to insertion of said certificate into said cookie header of said request.

9. The computer-readable storage media of claim 7, further comprising instructions to:
determine, prior to the inserting step, whether an existing cookie header is present in the request sent by the client machine; and
create a new cookie header if said existing cookie header is not present in the request sent by the client machine.

10. The computer-readable storage media of claim 9, further comprising instructions to:
add a specific cookie into the existing or new cookie header; and
assign a configurable default name to said specific cookie to enable the server machine to distinguish the certificate from cookies of the request.

11. The system of claim 6, wherein said analyzer is further configured to:
remove from said certificate all separators used in headers of the request prior to insertion of said certificate into said cookie header of said request.

12. The system of claim 6, wherein said analyzer is further configured to:
determine, prior to said inserting, whether an existing cookie header is present in the request sent by the client machine; and
create a new cookie header if said existing cookie header is not present in the request sent by the client machine.

13. The system of claim 12, wherein said analyzer is further configured to:
add a specific cookie into the existing or new cookie header; and
assign a configurable default name to said specific cookie to enable the server machine to distinguish the certificate from cookies of the request.

14. The apparatus of claim 5, wherein said security machine is further configured to:

remove from said certificate all separators used in headers of the request prior to insertion of said certificate into said cookie header of said request.

15. The apparatus of claim 5, wherein said security machine is further configured to:

determine, prior to said inserting, whether an existing cookie header is present in the request sent by the client machine; and create a new cookie header if said existing cookie header is not present in the request sent by the client machine.

16. The apparatus of claim 15, wherein said security machine is further configured to:

add a specific cookie into the existing or new cookie header; and assign a configurable default name to said specific cookie to enable the server machine to distinguish the certificate from cookies of the request.

* * * * *